June 1, 1943. G. B. GOODMAN 2,320,862
METHOD OF AND MEANS FOR MAKING TUBULAR RIVETS OR SOCKETS
Filed March 31, 1942 2 Sheets-Sheet 1
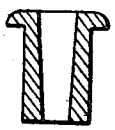
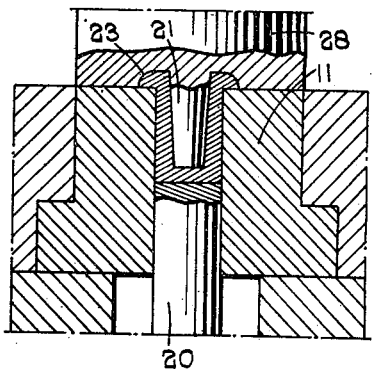
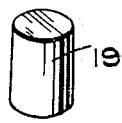
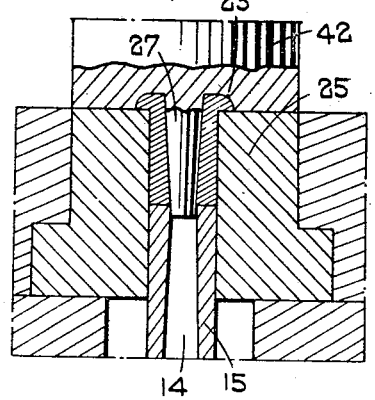
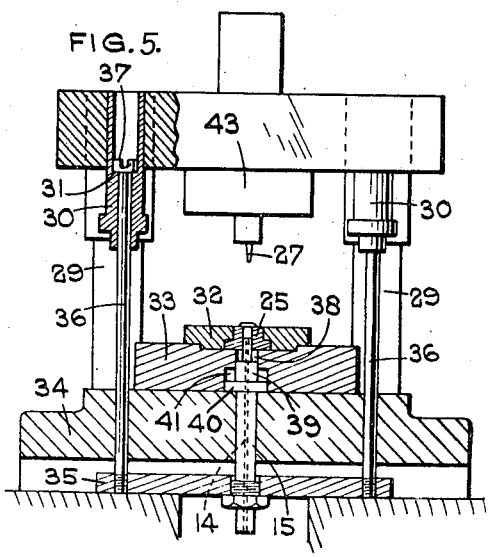
INVENTOR
GRAHAM BRADFORD GOODMAN
BY
HIS ATTORNEY June 1, 1943.                G. B. GOODMAN                2,320,862
        METHOD OF AND MEANS FOR MAKING TUBULAR RIVETS OR SOCKETS
                Filed March 31, 1942        2 Sheets-Sheet 2
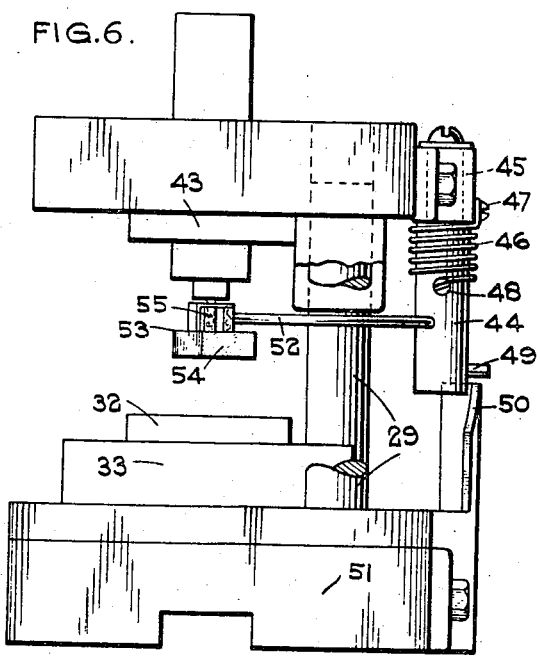
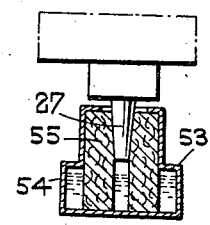
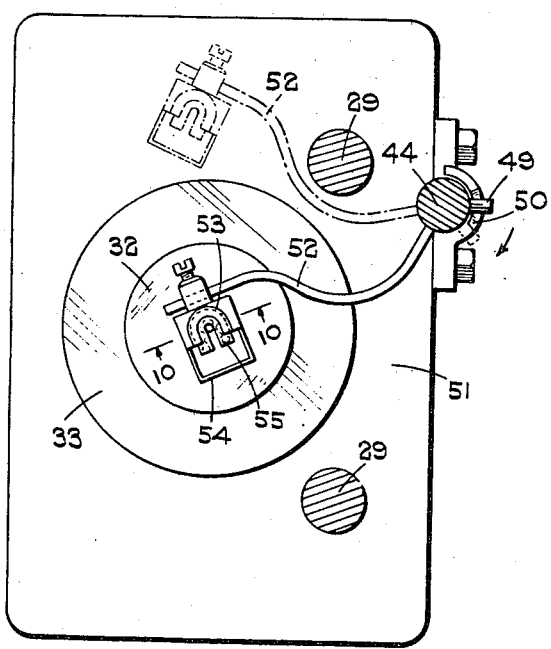
INVENTOR
GRAHAM BRADFORD GOODMAN
BY Henry J. Lucke
HIS ATTORNEY Patented June 1, 1943

2,320,862

UNITED STATES PATENT OFFICE 2,320,862

METHOD OF AND MEANS FOR MAKING TUBULAR RIVETS OR SOCKETS

Graham Bradford Goodman, Birmingham, England, assignor to George Goodman Limited, Birmingham, England Application March 31, 1942, Serial No. 436,950
In Great Britain April 10, 1941

6 Claims. (Cl. 10—11)

This invention relates to the manufacture of rivets or sockets and one of its applications is to rivets of the known kind which have an external flange at one end forming a head, and which have an axial opening which is of smaller diameter adjacent the end remote from the head than the diameter of the remainder of the opening, these rivets usually being mounted upon a headed stem so that the rivet nearest the head can be placed in the hole in the work and the stem withdrawn so that the head thereof expands the end of the rivet remote from the rivet head, thus forming a second head and securing the rivet in position.

Hitherto it has been the practice to form the holes through these rivets by drilling axially.

The invention is also applicable to the manufacture of tubular sockets generally.

Referring to the drawings:

Figure 1 is a view in sectional side elevation showing a rivet produced by the methods forming the subject of the present invention.

Figure 2 is a perspective view showing a solid rivet blank used.

Figure 3 is a sectional view in side elevation showing the tools in operation and carrying out the first step of the first method in accordance with the present invention.

Figure 4 is a sectional view in side elevation showing the tools in operation and carrying out—(a) the second step of the first process according to the present invention, and (b) the process according to the second method in accordance with the present invention.

Figure 5 is a sectional view showing one method of operating the ejector.

Figure 6 is a view in side elevation showing the lubricating device.

Figure 7 is a plan view thereof.

Figure 8 is a section on line 10—10 of Figure 7.

According to the first method of the present invention (see Figures 1, 2, 3 and 4) a rivet blank 19 is used which is simply a short length of solid rod and is not provided with a head. This blank is cut off from a rod and preferably annealed before being acted on by the punch. The blank 19 is placed in the die 11 and rests upon the top of an ejector 20 (Figure 3), the upper end of which is solid as shown.

The rivet blank 19 is acted upon by a tapering punch 21 which is moved axially, the tool being mounted in a head 28 operated by a press or similar machine. The head 28 around the upper end of the tool 21 is formed with an annular recess as shown at 23. When the head and tool are moved downwardly, a recess is formed in the blank 19 and the metal displaced is extruded upwardly to fill the recess 23 and to form a head on the blank. At the same time an axially extending recess is formed which, however, does not penetrate the lower end of the blank.

After this operation is complete, the ejector 20 is operated and the partially finished blank is removed and inserted into another die 25 (see Figure 4) fitted with a hollow ejector 15.

The partially finished blank is now acted upon by a piercing tool 27 formed on, or fixed in, a downwardly moving head 42 so that a piece of the metal at the bottom of the recess previously formed in the blank and of a diameter equal to that of the smaller end of the tool 27 is now pierced out and drops through the ejector 15. The tapered sides of the tool 27 near its smaller end extrude a little of the metal of the rivet situated at the wall of the opening at its lower end, this metal flowing endwise. When this operation is complete, the head 42 and piercing tool 27 are moved upwardly as also is the ejector 15, so that the finished rivet is ejected.

According to the second method in accordance with the present invention (see Figures 1, 2, 4, and 5 of the drawings), the manufacture is carried out by using a solid rivet blank such as 19 which is placed in the die 25 and acted upon by the combined piercing and extruding tool 27. The head 42 is provided with the annular recess 23, and as the head and tool 27 are moved downwardly some of the metal lying adjacent the axis of the blank is first extruded upwardly to form the head forced out of the blank, and the remainder of said metal is forced downwardly through the hollow ejector 15. This metal is equal in diameter to the diameter of the smaller end of the tool 27. Further metal of the blank is extruded by the tapered sides of the tool as it passes through the blank to form the tapered hole.

After the operation is complete, the head 42 and tool 27 are moved upwardly and the ejector 15 operated to remove the rivet.

It will be observed that in both methods the punch used is of tapering form and produces a taper hole in the rivet.

Any suitable means may be used for operating the ejector, and one form of apparatus is shown in Figure 5 wherein the press head 43 sliding on pillars 29 is provided with a pair of sleeves 30 having internal shoulders 31. The die 25 is mounted in a die plate 32 resting in a recess in the upper surface of a plate 33, the plate 33 being supported on a bed 34 of bridge-like form. Under the bed 34 is a plate 35 carried by a pair of long screws 36, the heads 37 of which engage the shoulders 31.

As will be seen the plate 33 is provided with an opening 38 in which the upper part 39 of the ejector 15 can slide, and the ejector is also provided with a flange 40 moving in a recess 41 in the underside of the plate 33.

The arrangement is such that as the head 43 moves downwardly to effect the extruding and piercing operations, the rivet or blank is solidly supported on the end of the ejector. When the head 43 moves upwardly again after the punch has left the rivet or blank, the internal shoulders 31 engage the heads 37 of the screws 36 and lift the plate 35 so as to move the ejector upwardly in a manner to push the rivet or blank out of the die 25.

The invention is primarily intended for application to rivets of the class described but it can also be applied to the production of headed sockets which may be screwed either in the interior or upon the exterior, the screw threads being produced subsequent to the production of the socket in the manner herein described.

The rivets or sockets can conveniently be produced in light metal alloys but the production is not necessarily confined to these metals.

It is of importance that the punch should be lubricated before each of its operations and in order to enable this to be done automatically the head 43 of the press may be provided with a pin 44 as shown in Figures 6 to 8, the pin having a reduced portion 45 mounted in a lug on the head and the pin being mounted for rotation on an axis which is vertical to the movement of the head.

Further, a torsion spring 46 is provided on the pin having one end fixed as shown at 47 and the other end 48 secured to the pin, the torsion spring tending to move the pin into the position shown in full lines in Figure 7.

Projecting radially from the pin is a projection or lug 49 adapted to engage a cam 50 placed on the bed 51 of the press, the arrangement being such that when the head 43 of the press makes its working stroke, the projection 49 engages the cam and causes the pin 44 to rotate to bring an arm 52 carrying the lubricator 53 into the position shown in chain dot lines in Figure 7, thus allowing the punch to descend and perform its operation.

The lubricator may consist of a container 54 containing oil having a U shaped absorbent member 55 projecting upwardly from the lubricant and adapted to embrace the punch which is indicated at 27.

What I claim then is:

1. A method of making tubular metal articles including placing a solid blank in a primary die, supporting the blank against endwise movement in the die by the solid end of an ejector, acting upon the blank by a lubricated tapering punch moving axially, said punch moving with a head having an annular recess around the end of the punch, the punch forming an axial tapering recess in the end of the blank and causing the displaced metal to flow in a direction contrary to the movement of the punch and to flow into and fill said recess to form a head on the blank, withdrawing the punch and its head, ejecting the blank, inserting the blank in a secondary die and acting upon the blank by a piercing punch which pierces out the metal of the blank at the end of the recess therein.

2. A method of making tubular metal articles including placing a solid blank in a primary die, supporting the blank against endwise movement in the die, acting on the end of the blank by a lubricated punch, said punch moving with a head having an annular recess around the end of the punch, the punch forming a recess in the end of the blank and causing the displaced metal to flow in a direction contrary to the movement of the punch and to flow into and fill said recess to form a head on the blank, withdrawing the punch and its head, ejecting the blank, inserting the blank in a secondary die and acting upon the blank by a piercing punch which pierces out the metal of the blank at the end of the recess therein.

3. A method of making tubular metal articles including placing a solid blank in a primary die, acting upon the blank by an axially moving lubricated punch, the diameter of which varies at different positions along its length, the smallest diameter being at the end, said punch moving with a head having an annular recess around the end of the punch, the punch forming a recess in the end of the blank and causing the displaced metal to flow in a direction contrary to the movement of the punch and to flow into and fill said recess to form a head on the blank, withdrawing the punch and its head, ejecting the blank, inserting the blank in a secondary die and acting upon the blank by a tapering piercing punch which completes the hole through the blank and shapes its smaller end to a taper.

4. A method of making tubular rivets or like articles of the kind having a tapered bore and an external flange constituting a head located at the end corresponding with the maximum diameter of the bore, from a solid blank of even diameter, the blank being placed in a die adapted to prevent any increase in diameter of the blank and to restrain endwise movement of the blank in one direction, forcing into the blank a tapered and lubricated punch of a form corresponding with the tapered bore to be formed in the blank, some of the metal displaced by the punch flowing in a direction opposite to the direction of movement of the punch out of means restraining the blank against any increase in diameter, limiting the flow of said displaced metal in an axial direction and permitting it to flow laterally to form a rivet head, the remainder of said metal being forced out of the blank in the direction of movement of the punch.

5. Means for making tubular rivets or like articles from a solid blank of wire comprising a hollow die for receiving the blank and restraining it against radial expansion and against endwise movement in one direction, an ejector for removing the finished article and serving as the bottom of the die during the manufacturing operation, a punch having a shoulder adapted to meet the upper surface of the die and having also a tapered portion corresponding with the hole to be formed in the blank, an annular recess in the punch around said tapered portion and of a shape corresponding with the head to be formed on the rivet and into which the metal of the blank is caused to flow in a direction contrary to the movement of the punch when the punch is forced into the blank, and means for lubricating the punch before insertion into the blank.

6. A method of making tubular rivets or like articles consisting in forcing a lubricated taper punch axially into a cylindrical blank of larger diameter than the punch, restraining the blank against radial expansion and restraining it against endwise movement in one direction during movement of the punch, some of the metal displaced by the punch flowing in a direction opposite to the direction of movement of the punch out of means restraining the blank against radial expansion to form a rivet head, the remainder of said displaced metal being forced out of the blank in the direction of movement of the punch.

GRAHAM BRADFORD GOODMAN.